United States Patent [19]

Kneser et al.

[11] Patent Number: 5,745,876
[45] Date of Patent: Apr. 28, 1998

[54] SINGLE-COUNT BACKING-OFF METHOD OF DETERMINING N-GRAM LANGUAGE MODEL VALUES

[75] Inventors: Reinhard Kneser; Hermann Ney, both of Aachen, Germany

[73] Assignee: U.S. Philips Corporation, New York, N.Y.

[21] Appl. No.: 642,012

[22] Filed: May 2, 1996

[30] Foreign Application Priority Data

May 5, 1995 [DE] Germany ............ 195 16 099.1

[51] Int. Cl.$^6$ ................................ G10L 5/06
[52] U.S. Cl. ............................ 704/255; 704/257
[58] Field of Search .............. 395/2.64, 2.66; 704/255, 257

[56] References Cited

U.S. PATENT DOCUMENTS

| | | | |
|---|---|---|---|
| 4,831,550 | 5/1989 | Katz | 395/2.49 |
| 5,293,584 | 3/1994 | Brown et al. | 395/2.86 |
| 5,444,617 | 8/1995 | Merialdo | 395/759 |
| 5,467,425 | 11/1995 | Lau et al. | 395/2.52 |
| 5,502,791 | 3/1996 | Nishimura et al. | 395/2.65 |

OTHER PUBLICATIONS

Azarshid Farhat, Jean-Francois Isabelle, and Douglas O'Shaughnessy, "Clustering Words for Statistical Language Models Based on Contextual Word Similarity", Proceedings of IEEE ICASSP 96, pp. 180–183, May 1996.
Reinhard Kneser and Hermann Ney, "Improved Backing-Off for M-Gram Language Modeling", Proc. IEEE ICASSP 95, pp. 181–184, May 1995.

*Primary Examiner*—Allen R. MacDonald
*Assistant Examiner*—Tālivaldis Ivars Šmits

[57] ABSTRACT

For the recognition of coherently spoken speech with a large vocabulary, language model values which take into account the probability of word sequences are considered at word transitions. Prior to the recognition, these language model values are derived on the basis of training speech signals. If the amount of training data is kept within sensible limits, not all word sequences will actually occur, so that the language model values for, for example an N-gram language model must be determined from word sequences of N−1 words actually occurring. In accordance with the invention, these reduced word sequences from each different, complete word sequence are counted only once, irrespective of the actual frequency of occurrence of the complete word sequence or only reduced training sequences which occur exactly once in the training data are taken into account.

3 Claims, No Drawings

SINGLE-COUNT BACKING-OFF METHOD OF DETERMINING N-GRAM LANGUAGE MODEL VALUES

BACKGROUND OF THE INVENTION

The invention relates to a method of determining language model values which are used to derive word sequences from a speech signal. From the speech signal there are derived test signals which are compared with sequences of reference signals which correspond to words of a predetermined vocabulary. The comparison yields scores which are incremented by a language model value at word transitions. The scores incremented by the language model values are summed and, no later than at the end of the speech signal, the word sequences determined on the basis of the most attractive scores are output.

The language model values serve to take into account the probability of occurrence of word sequences with a predetermined number of given, successive words in a normal case. In the case of a number of N successive words, the set of language model values is referred to as an N-gram model. The bigram or trigram models, with N=2 and N=3, respectively, are often used; however, models with N>3 are also feasible, be it that their implementation requires a greater expenditure. The reliability of the determination of word sequences, i.e. the reliability that the word sequence determined indeed corresponds to the actually spoken word sequence in the speech signal, is enhanced by the use of language models; suitable results are obtained already by means of a trigram model in normal circumstances.

Prior to the determination of word sequences from an unknown speech signal, the language model values are derived from a predetermined training speech signal during a training phase. To this end, it is counted how often the various word sequences occur, from the count there being determined a probability value for such word sequences, which probability value essentially indicates the language model value. Because a training speech signal may not be excessively long for practical reasons, notably in the case of a large vocabulary it may occur that some word sequences are not present in the training speech signal. However, in order to ensure that such word sequences are not given the probability zero, so that they are excluded from the recognition, non-zero language model values must be assigned also to such word sequences. To this end, use is made of so-called backing-off strategies which derive the probability of the non-occurring word sequences from the actually occurring word sequences. Various interpolation methods are known for such backing-off strategies.

Normally speaking, the probability values of individual word sequences are chosen so that the sum of the probability values of all feasible word sequences has the value 1. For actually occurring complete word sequences an estimated value is assumed which is smaller than the relative frequency, i.e. the number of times that a given complete word sequence has occurred to the number of times that the word sequence minus the last word has occurred. Thus, a value is subtracted from the number of times that the word sequence has occurred, N; this may be referred to as discounting. In conformity with a coarser distribution, i.e. a word sequence reduced by the first word, the probability mass thus acquired is distributed between the word sequences which have not occurred. The type of discounting is defined by the relevant interpolation method.

Generally speaking, the interpolation methods can be represented by the following diagram:

$$p(W_M|h) = \begin{cases} \alpha(W_M|h) & \text{if } N(h,W_M) > 0 \\ \gamma(h)\beta(W_M|\hat{h}) & \text{if } N(h,W_M) = 0 \end{cases}$$

Therein, h is a word sequence of words, $w_1 \ldots w_{M-1}$, $\hat{h}$ is a word sequence of words $w_2 \ldots w_{M-1}$, reduced by the first word, and $p(w_M|h)$ is the conditional probability that after the word sequence h the word $w_M$ follows, $\alpha(w_M|h)$ is the estimate, determined by the discounting in conformity with the interpolation method used, for the word sequence occurring, $\beta(w_M|\hat{h})$ is the coarser distribution for the word sequence reduced by the first word, and $\gamma(h)$ is a function from the condition that all estimated values p in the sum should produce the value 1. Furthermore, $N(h,w_M)$ is the number of times that the word sequence comprising the words $w_1 \ldots w_M$ has occurred in the training speech signal.

Normally it is assumed that $\beta(w_M|\hat{h})=p(w_M|h)$, so derived from the count of the word sequence reduced by the first word. However, for the complete word sequence which has not occurred in the training speech signal this may lead, at least in some cases, to a language model value which may substantially deviate from the actual probability in natural speech.

SUMMARY OF THE INVENTION

It is an object of the invention to provide a method of determining language model values while utilizing interpolation methods in which the language model values for word sequences which have not occurred in the training phase are adapted better to their actual probability of occurrence in natural speech.

In order to achieve this object, in interpolation methods in which the language model values for non-occurring word sequences are determined from the frequency of occurrence of reduced word sequences, for the determination of the frequency of a given word sequence reduced by the first word each individual complete word sequence in which said reduced word sequence is contained and which has occurred at least once in the text speech signal is taken into account no more than once, regardless of the actual frequency of occurrence.

It is thus avoided that a complete word sequence which has not occurred in the training speech signal and in which particularly frequently occurring reduced word sequences are present by chance is given a high probability and a corresponding language model value.

DESCRIPTION OF THE PREFERRED EMBODIMENTS

A simple method of taking complete word sequences into account only once has reduced word sequences taken into account for the language model values for non-occurring word sequences only if they stem from complete word sequences which have occurred exactly once in the training speech signal. Thus, it is automatically avoided that individual, frequently occurring reduced word sequences lead to the assumption of a high probability also for the associated complete word sequences.

Another version of the method in accordance with the invention is that the reduced word sequences from each different complete word sequence occurring in the training speech signal are taken into account exactly once. It is thus also avoided that frequent, reduced word sequences result in an inappropriate probability for complete word sequences.

The former method can be expressed as follows:

$$p(W_M|\hat{h}) = \begin{cases} \dfrac{N_1(x,\hat{h},W_M) - d}{\sum_z N_1(x,\hat{h},z)} & \text{if } N(x,\hat{h},W_M) > 0 \\ \gamma(\hat{h})\beta(W_M|\hat{h}) & \text{if } N(x,\hat{h},W_M) = 0 \end{cases}$$

Therein, h' denotes word sequences $w_3 \ldots w_{M-1}$ reduced by the first two words and the last word, d denotes the discounting value and $N_1(x,\hat{h},w_M)$ is the number of different, complete word sequences with M words which occur exactly once and which correspond, except for the first word, to the word sequence for which the probability or the language model value is to be determined. In the event that no such word sequence has occurred in the training speech signal, $\beta(w_M|\hat{h})$ is determined in the same way from word sequences reduced by a further word. The discounting value d may be a constant value or may also be dependent on the relevant word sequence.

In the other case the approach is substantially the same, be it that the counter does not count the reduced word sequences having occurred only once, but all relevant word sequences which have occurred; however, for each word sequence occurring only one value 1 is added, regardless of how often the relevant word sequence has actually occurred.

A language model, i.e. the language model values, is thus formed for the individual word sequences where the language model values at least approximate the actual probabilities of the word sequences in natural speech.

What is claimed is:

1. A method of determining the language model values for deriving word sequences from a speech signal by deriving training signals from the speech signal, comparing the training signals with sequences of reference signals which each correspond to a respective word of a predetermined vocabulary in order to derive scores, and incrementing each score by a language model value for each transition from one word to another word, the language model value indicating the relative probability of word sequences of a predetermined number of defined, successive words, the method comprising:

(a) in a training phase, determining the language model values of at least a part of all feasible word sequences from a predetermined training speech signal by counting the frequency of occurrence of individual word sequences, and (b) deriving the language model values for complete word sequences which are not present in the training speech signal from the frequencies of word sequences which have been reduced by the first word and which are present in complete word sequences which have occurred at least once in the training speech signal, in such a manner that each different, complete word sequence is taken into account no more than once for determining the frequency of the reduced word sequences present therein, irrespective of the actual frequency of occurrence.

2. A method as claimed in claim 1, wherein reduced word sequences exclusively from complete sequences having occurred exactly once in the training speech signals are taken into account for the language model values for word sequences which have not occurred.

3. A method as claimed in claim 1, wherein the reduced word sequences from each different complete word sequence occurring in the training speech signal are taken into account exactly once.

* * * * *